(12) United States Patent
Nakazato et al.

(10) Patent No.: US 10,335,963 B2
(45) Date of Patent: Jul. 2, 2019

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventors: Yusuke Nakazato, Tokyo (JP); Kazuhiko Kobayashi, Yokohama (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 15/533,960

(22) PCT Filed: Nov. 17, 2015

(86) PCT No.: PCT/JP2015/005745
§ 371 (c)(1),
(2) Date: Jun. 7, 2017

(87) PCT Pub. No.: WO2016/092749
PCT Pub. Date: Jun. 16, 2016

(65) Prior Publication Data
US 2017/0326739 A1    Nov. 16, 2017

(30) Foreign Application Priority Data

Dec. 9, 2014  (JP) .................. 2014-249426

(51) Int. Cl.
*B25J 19/00*    (2006.01)
*B25J 19/02*    (2006.01)
(Continued)

(52) U.S. Cl.
CPC .......... *B25J 19/023* (2013.01); *B25J 9/1612* (2013.01); *B25J 13/081* (2013.01); *B25J 13/082* (2013.01);
(Continued)

(58) Field of Classification Search
CPC ...... B25J 19/023; B25J 13/082; B25J 13/081; B25J 9/1612; G01B 11/002;
(Continued)

(56) References Cited

U.S. PATENT DOCUMENTS

| 7,591,078 B2 * | 9/2009 | Crampton | ............. B25J 13/088 33/503 |
| 9,437,005 B2 * | 9/2016 | Tateno | ................. G01B 11/002 |

(Continued)

FOREIGN PATENT DOCUMENTS

| JP | H05-288543 A | 11/1993 |
| JP | 2008-014691 A | 1/2008 |

(Continued)

OTHER PUBLICATIONS

Tom Drummond and Roberto Cipolla, Real-time Visual Tracking of Complex Structures, IEEE Transactions on Pattern Analysis and Machine Intelligence, vol. 24, No. 7, pp. 932-946, Jul. 2002.

(Continued)

*Primary Examiner* — Jason Holloway
(74) *Attorney, Agent, or Firm* — Canon U.S.A., Inc. IP Division

(57) ABSTRACT

A position and an orientation of an object are measured with high accuracy. An approximate position-orientation of a target object is obtained, positional information of the target object is obtained by measuring the target object using a noncontact sensor, positional information of contact positions touched by a contact sensor is obtained by bringing the contact sensor into contact with the target object, and a position-orientation of the target object is obtained by associating shape information of the target object with the positional information of the target object and the positional information of the contact positions in accordance with the approximate position-orientation.

12 Claims, 10 Drawing Sheets

(51) Int. Cl.
*B25J 9/16* (2006.01)
*B25J 13/08* (2006.01)
*G01B 11/00* (2006.01)

(52) U.S. Cl.
CPC .. *G01B 11/002* (2013.01); *G05B 2219/39527* (2013.01); *G05B 2219/40575* (2013.01); *G05B 2219/40576* (2013.01)

(58) Field of Classification Search
CPC ........... G05B 2219/40576; G05B 2219/40575; G05B 2219/39527
See application file for complete search history.

(56) References Cited

U.S. PATENT DOCUMENTS

| | | | | |
|---|---|---|---|---|
| 9,943,964 | B2* | 4/2018 | Hares | B25J 9/1679 |
| 2008/0235970 | A1* | 10/2008 | Crampton | B25J 13/088 |
| | | | | 33/503 |
| 2011/0192247 | A1* | 8/2011 | Matsukuma | B25J 9/104 |
| | | | | 74/490.03 |
| 2013/0010070 | A1* | 1/2013 | Tateno | G01B 11/002 |
| | | | | 348/46 |
| 2017/0282363 | A1* | 10/2017 | Yamada | B25J 9/1612 |
| 2017/0326739 | A1* | 11/2017 | Nakazato | G01B 11/002 |

FOREIGN PATENT DOCUMENTS

| | | |
|---|---|---|
| JP | 2008-309671 A | 12/2008 |
| JP | 2012-011531 A | 1/2012 |
| JP | 2013-032922 A | 2/2013 |

OTHER PUBLICATIONS

Andrew E. Johnson and Martial Hebert, Using Spin Images for Efficient Object Recognition in Cluttered 3D Scenes, IEEE Transactions on Pattern Analysis and Machine Intelligence, vol. 21, No. 5, pp. 433-449, May 1999.

William Hoff and Tyrone Vincent, Analysis of Head Pose Accuracy in Augmented Reality, IEEE Transactions on Visualization and Computer Graphics, vol. 6, No. 4, pp. 319-334, Oct. 2000.

* cited by examiner

[Fig. 1]
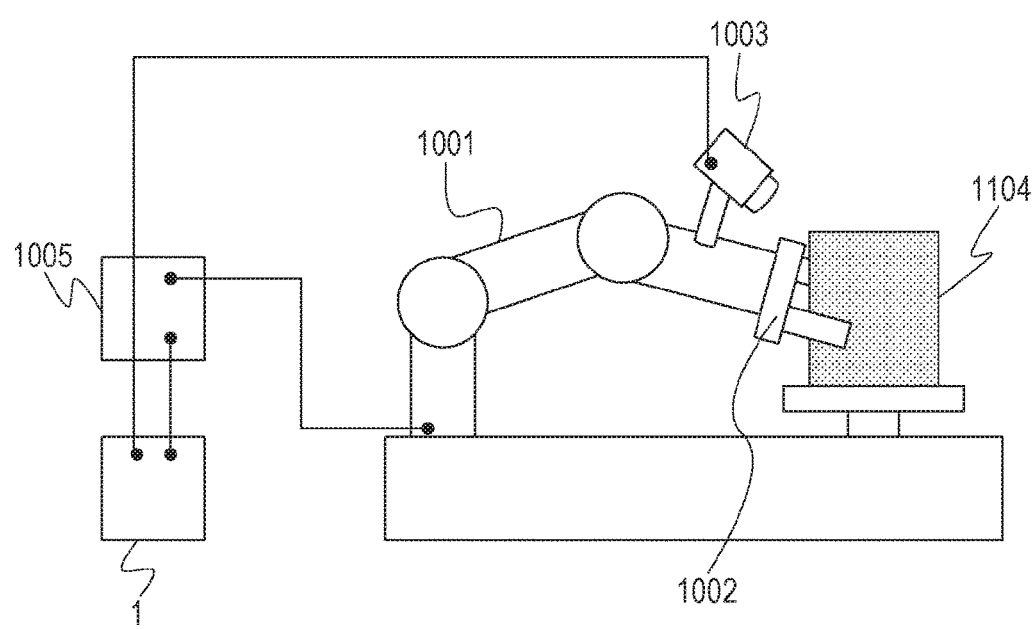

[Fig. 2]
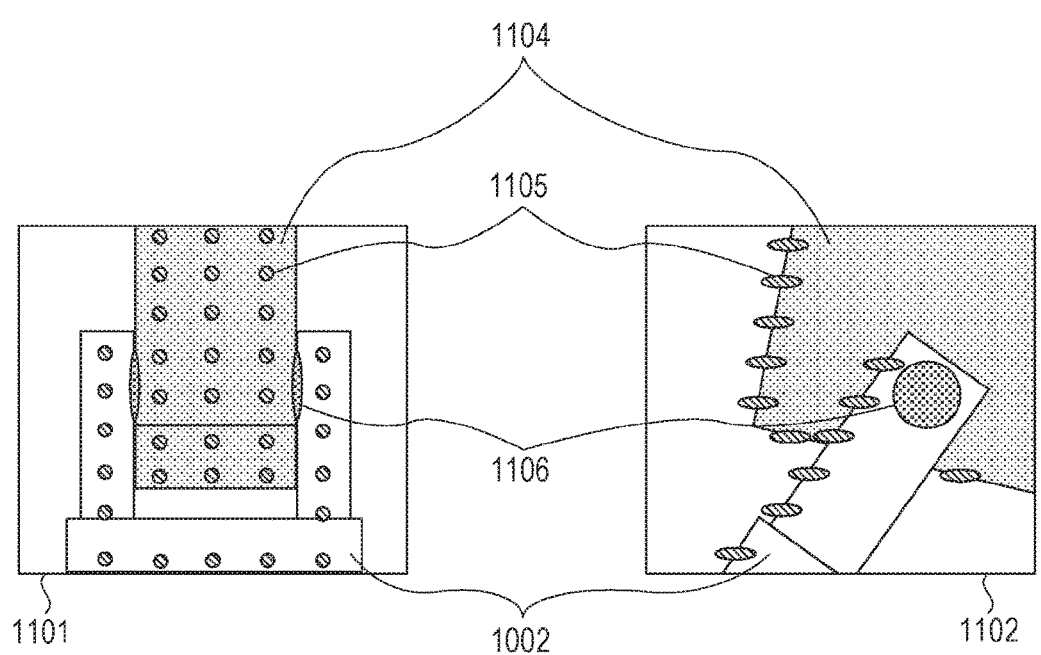

[Fig. 3]
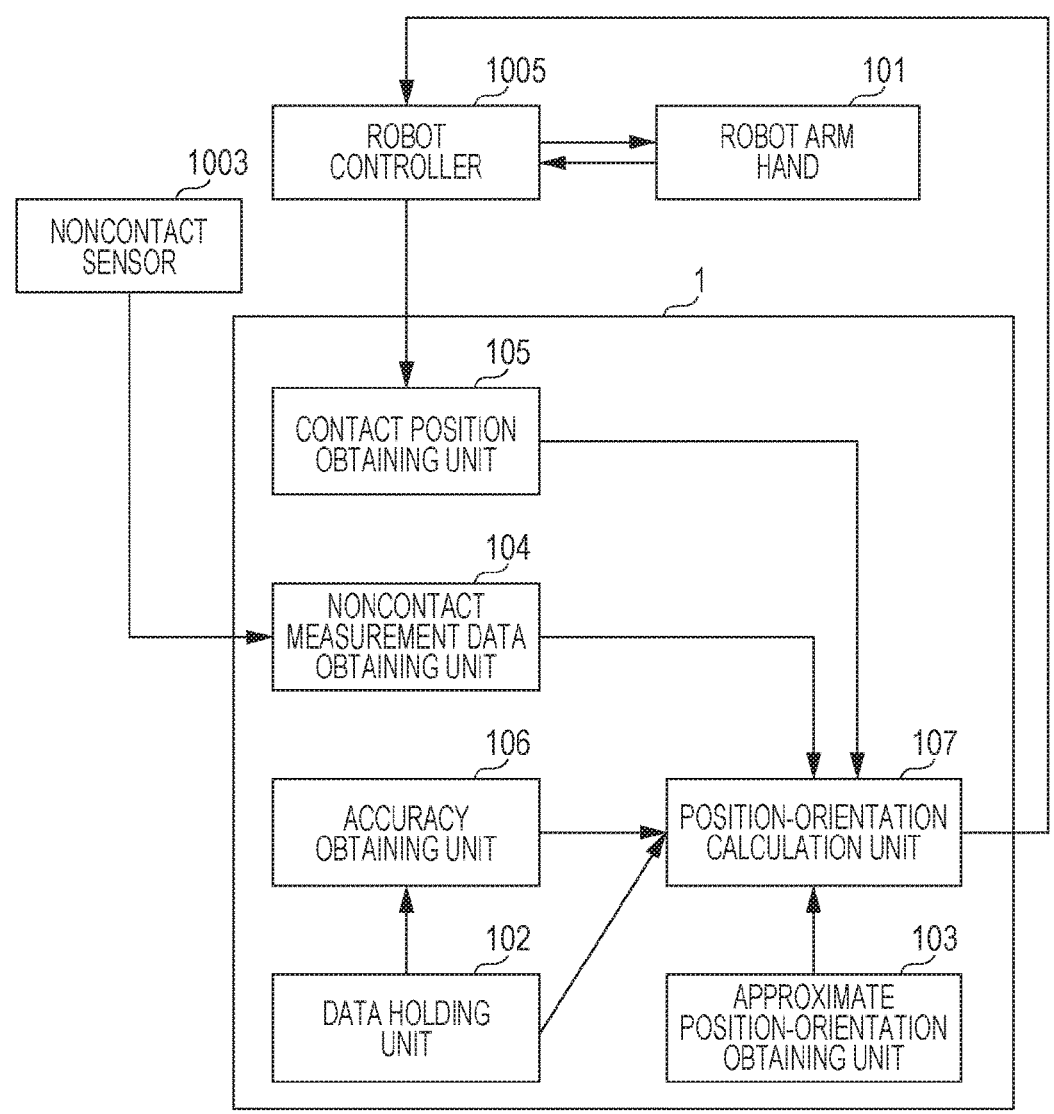

[Fig. 4]
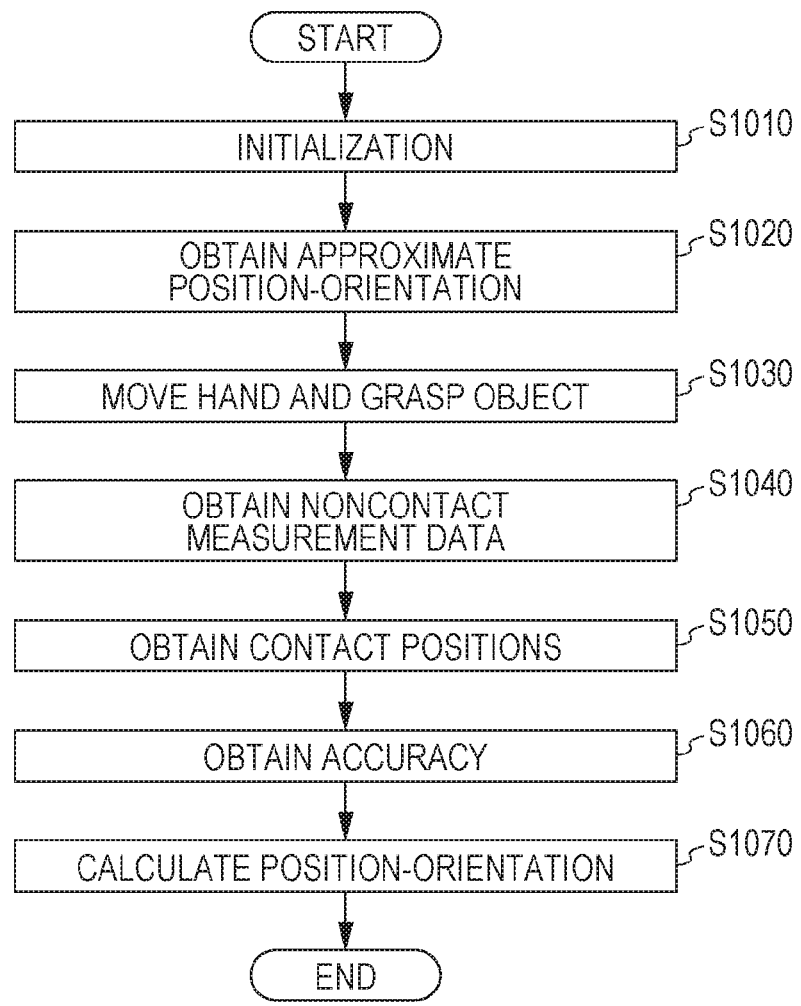

[Fig. 5]
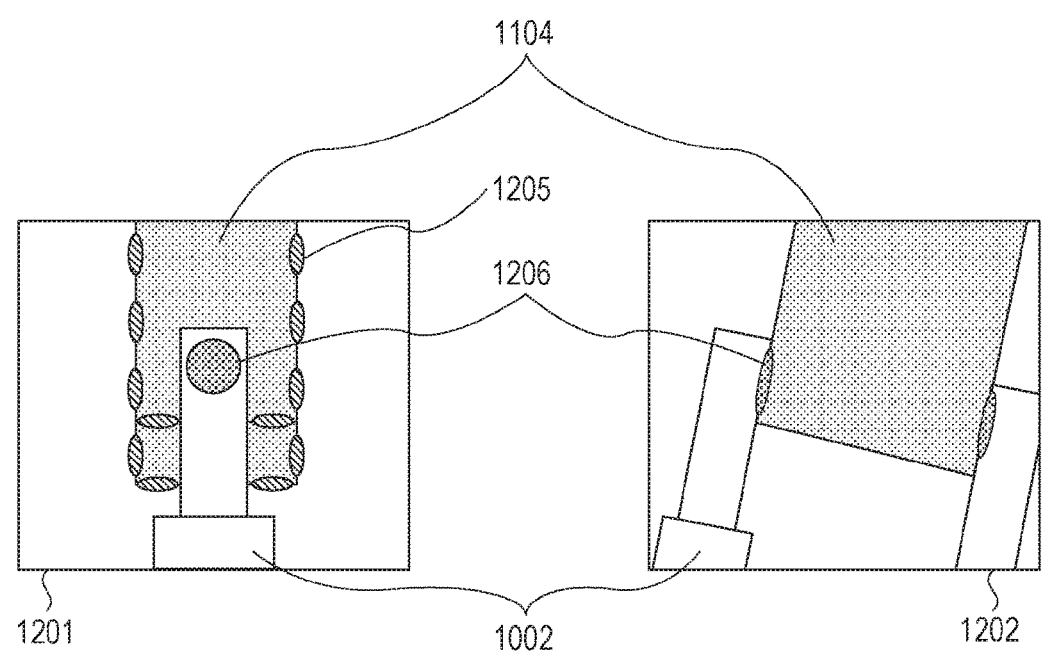

[Fig. 6]
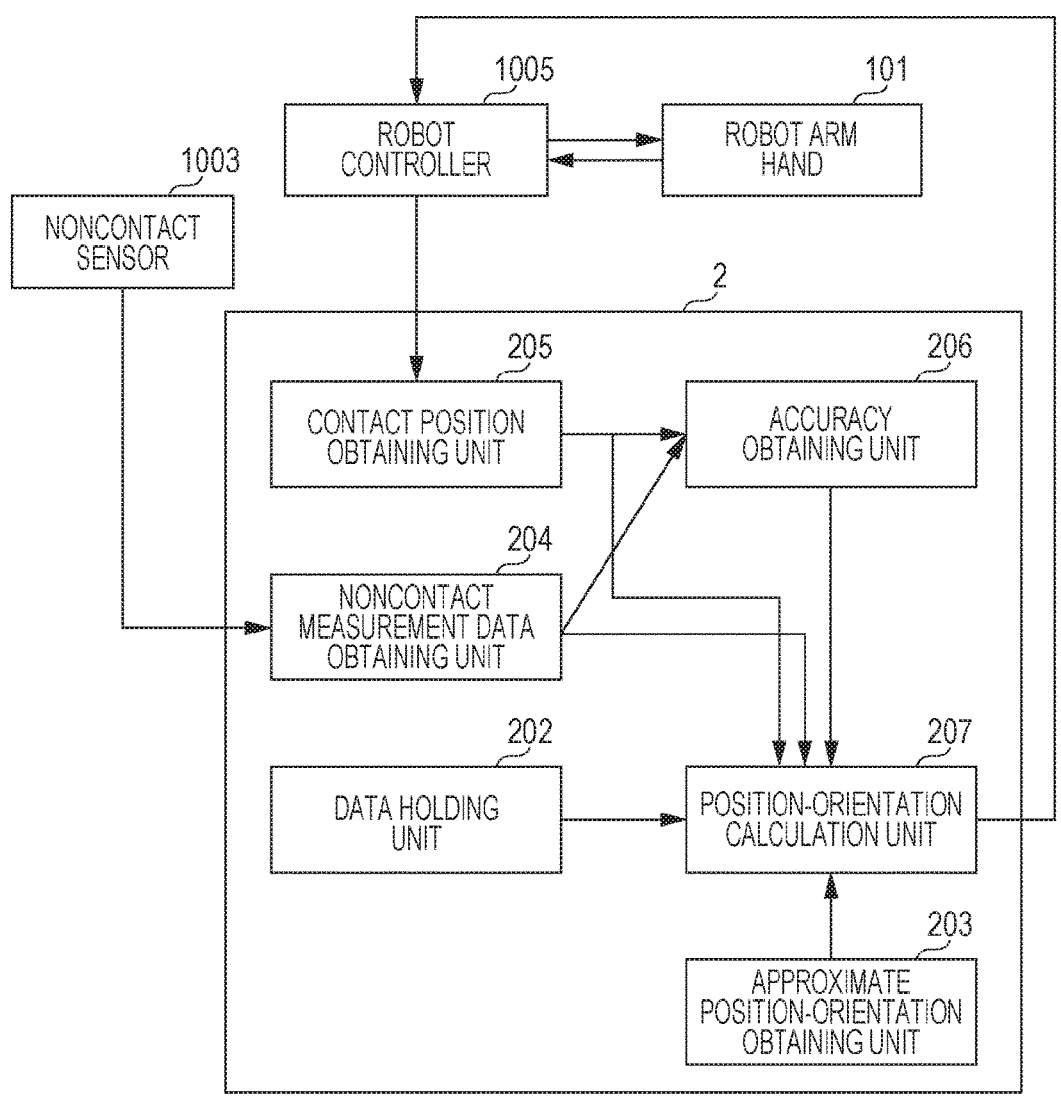

[Fig. 7]
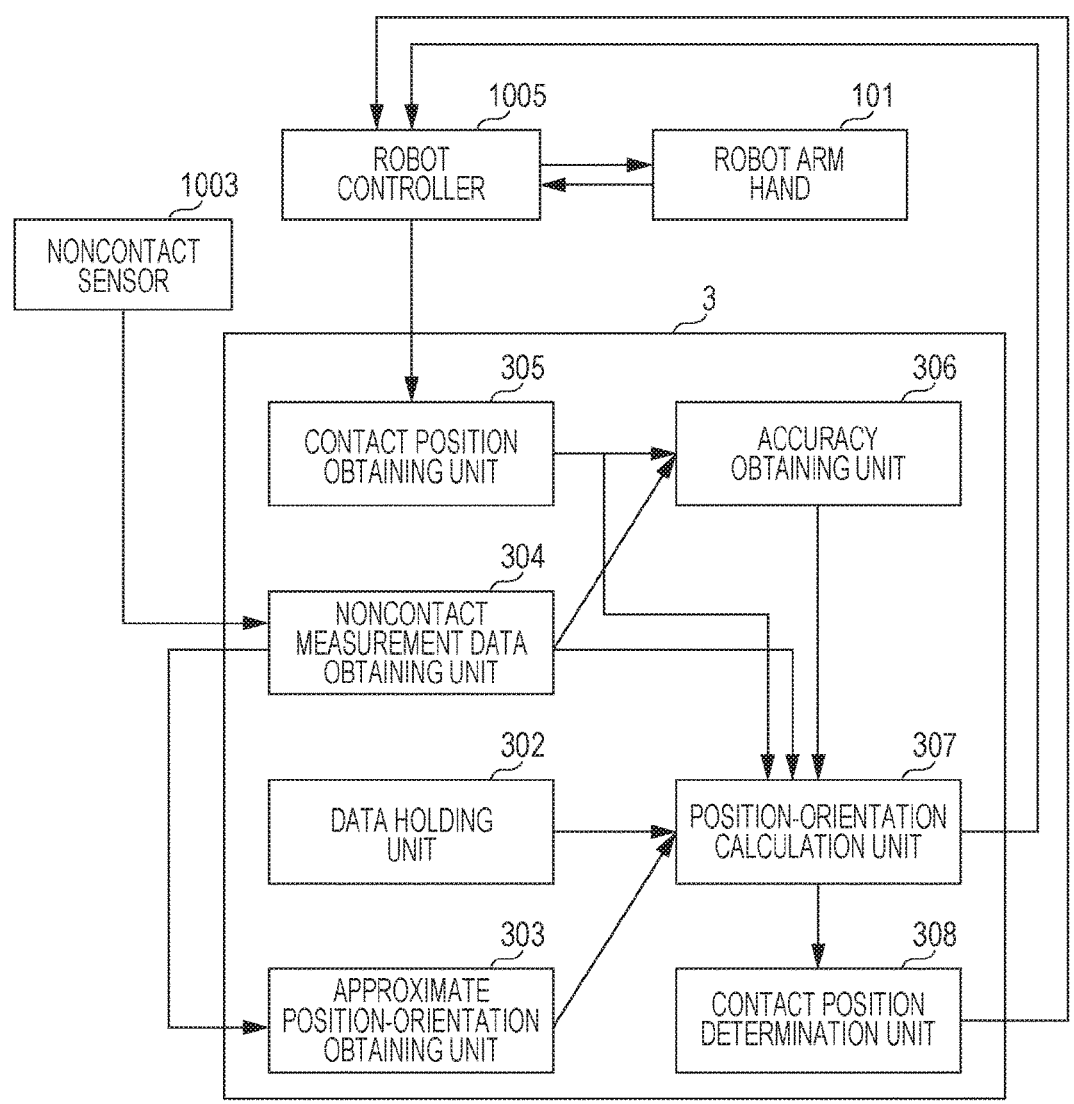

[Fig. 8]
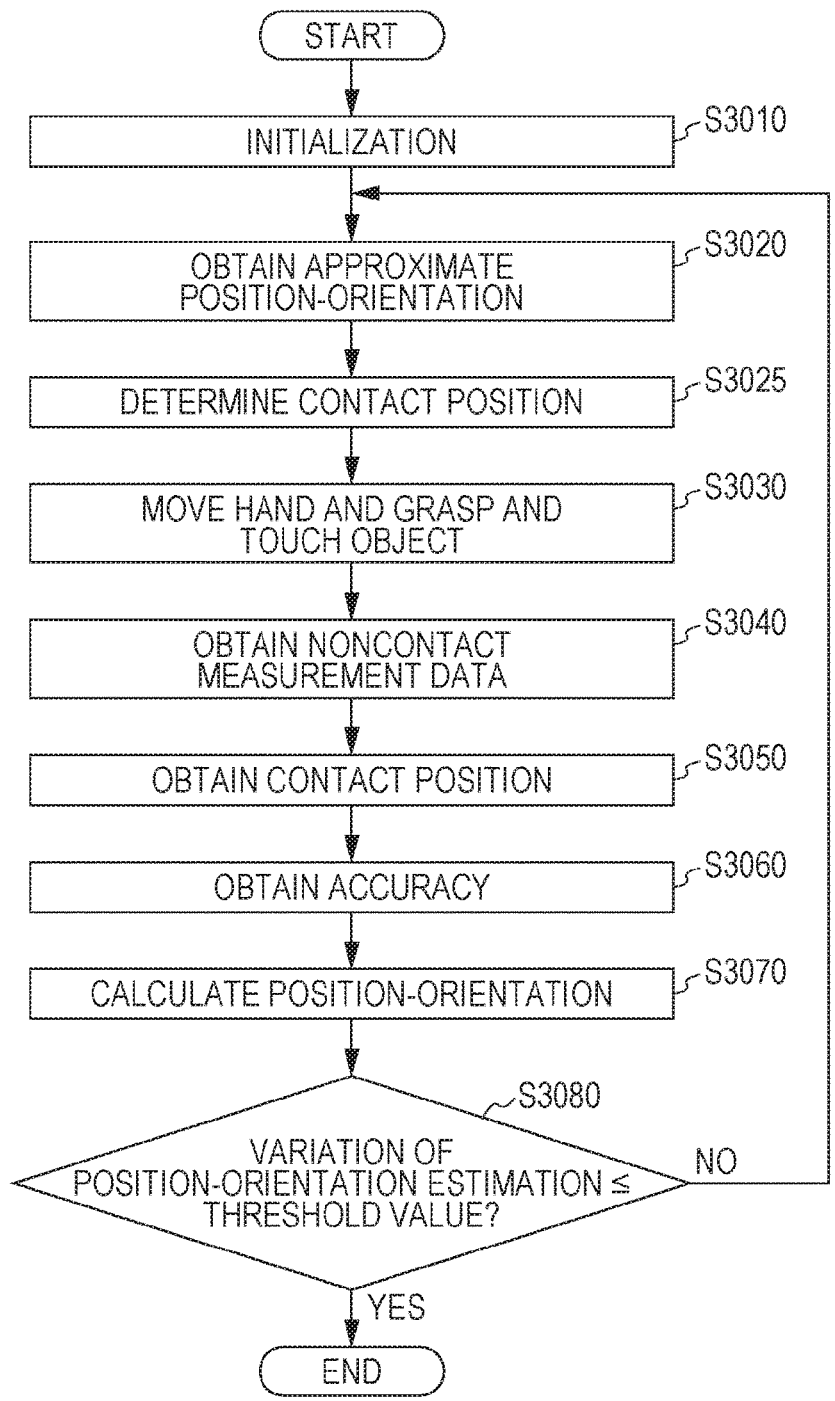

[Fig. 9]
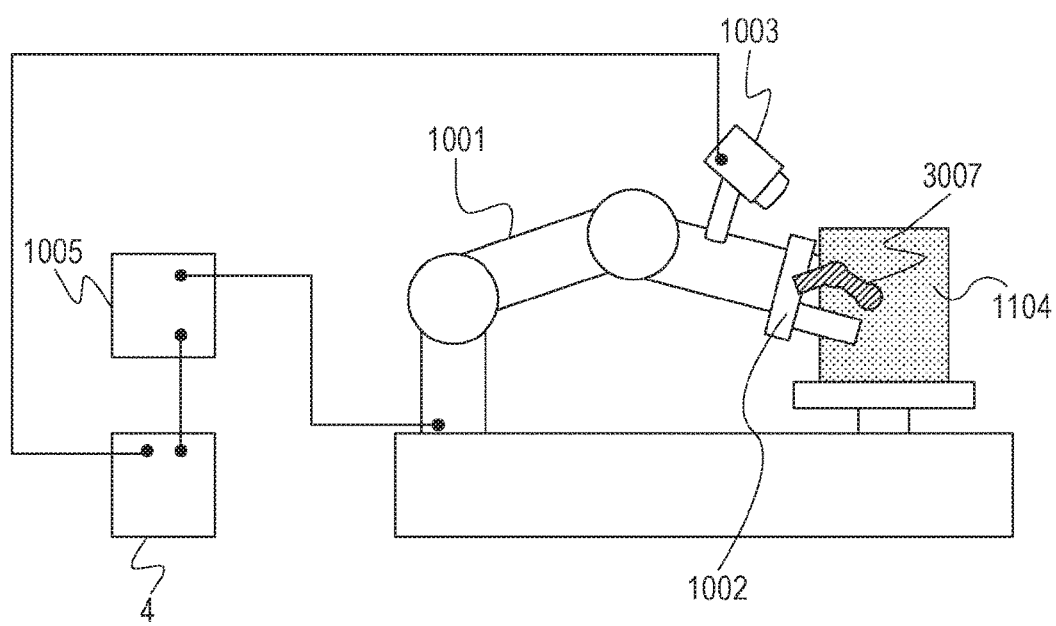

[Fig. 10]
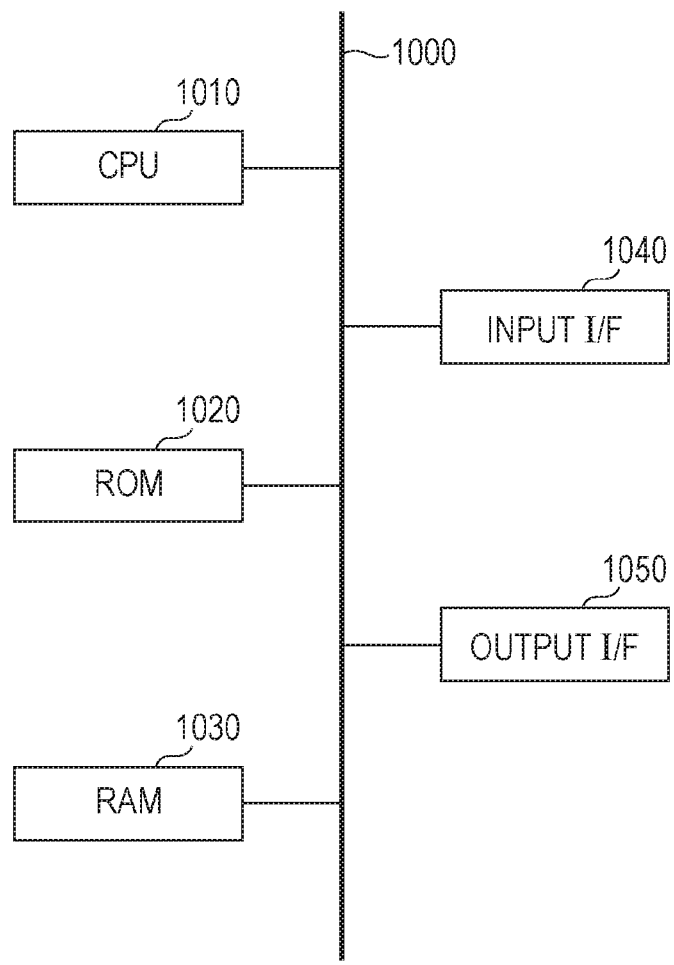

INFORMATION PROCESSING APPARATUS, INFORMATION PROCESSING METHOD, AND PROGRAM

TECHNICAL FIELD

The present invention relates to a technique of measuring a position and an orientation of an object having a three-dimensional shape recognized in advance.

BACKGROUND ART

In automatic assembly of a product by an industrial robot, the robot grasps a component after measuring a relative position and a relative orientation between the component to be grasped and the robot (a hand thereof). Examples of a method for measuring a position and an orientation include a measurement method using model fitting in which a three-dimensional model of an object is fitted to features detected in an image captured by a camera attached to the robot or installed in an environment and a range image obtained by a noncontact sensor (refer to NPL 1).

In an operation of assembling a complicated component, an image suitable for obtaining a position-orientation of the component may not be captured. In particular, when the robot grasps the component, the component is hidden by the robot hand, and therefore, features required for calculating the position-orientation of the component are lacked, and accordingly, the calculation of the position-orientation may fail. Furthermore, only a portion of the object may be captured by the camera installed near the robot hand, and therefore, it is likely that the calculation of the position-orientation of the component fails. Therefore, in general, the number of measurement apparatuses is required to be increased or an image capturing position is required to be adjusted so that the features required for the calculation of the position-orientation are sufficiently captured.

PTL1 discloses a method for obtaining a position of a target object by a detection unit using a captured image and correcting the obtained position in accordance with a position touched by a robot hand. However, in the method disclosed in PTL1, it is difficult to correct the position if the position of the target object is not obtained by the detection unit in a case where, for example, only a portion of the object is captured as described above.

CITATION LIST

Patent Literature

PTL 1: Japanese Patent Laid-Open No. 2012-11531

Non Patent Literature

NPL 1: T. Drummond and R. Cipolla, "Real-time visual tracking of complex structures". IEEE Transactions on Pattern Analysis and Machine Intelligence, vol. 24, no. 7, pp. 932-946, 2002
NPL 2: A. E. Johnson and M. Hebert, "Using Spin Images for Efficient Object Recognition in Cluttered 3D Scenes," IEEE Trans. on PAMI, vol. 21, no. 5, pp. 433-449, 1999
NPL 3: W. Hoff and T. Vincent, "Analysis of head pose accuracy in augmented reality," IEEE Trans. Visualization and Computer Graphics, Vol 6, No. 4, 2000.

SUMMARY OF INVENTION

The present invention provides an information processing apparatus including a data holding unit configured to hold information on a shape of a target object, an approximate position-orientation obtaining unit configured to obtain an approximate position-orientation of the target object, a positional information obtaining unit configured to obtain positional information of the target object by measuring the target object by a noncontact sensor, a contact position information obtaining unit configured to obtain positional information of contact positions touched by a contact sensor when the contact sensor is brought into contact with the target object, and a position-orientation obtaining unit configured to obtain a position-orientation of the target object by associating the shape information of the target object held in the data holding unit with at least one of the positional information of the target object and the positional information of the contact positions.

According to this specification, even when measurement information of a portion of an object may not be obtained, a position-orientation of the object may be measured with high accuracy.

Further features of the present invention will become apparent from the following description of exemplary embodiments with reference to the attached drawings.

BRIEF DESCRIPTION OF DRAWINGS

FIG. 1 is a diagram illustrating the relationship between an information processing apparatus and a target object according to a first embodiment.
FIG. 2 is a diagram schematically illustrating contact positions of the information processing apparatus and range measurement data according to the first embodiment.
FIG. 3 is a diagram illustrating a configuration of the information processing apparatus according to the first embodiment.
FIG. 4 is a flowchart illustrating a procedure of a process according to the first embodiment.
FIG. 5 is a diagram schematically illustrating the contact positions of the information processing apparatus and two-dimensional measurement data according to the first embodiment.
FIG. 6 is a diagram illustrating a configuration of an information processing apparatus according to a second embodiment.
FIG. 7 is a diagram illustrating a configuration of an information processing apparatus according to a third embodiment.
FIG. 8 is a flowchart illustrating a procedure of a process according to the third embodiment.
FIG. 9 is a diagram illustrating the relationship between an information processing apparatus and a target object according to a fourth embodiment.
FIG. 10 is a diagram illustrating a hardware configuration of the information processing apparatuses according to the present invention.

DESCRIPTION OF EMBODIMENTS

Before embodiments of the present invention are described, a hardware configuration of information processing apparatuses according to the embodiments will be described with reference to FIG. 10.

FIG. 10 is a diagram illustrating a hardware configuration of information processing apparatuses according to the embodiments of the present invention. In FIG. 10, a CPU 1010 integrally controls devices connected to the CPU 1010 through a bus 1000. The CPU 1010 reads and executes processing steps and programs stored in a read only memory (ROM) 1020. In addition to an operating system (OS), various processing programs, various device drivers, and the like of the embodiments which are stored in the ROM 1020 are temporarily stored in a random access memory (RAM) 1030, and executed by the CPU 1010 where appropriate. Furthermore, an input I/F 1040 receives input signals from external apparatuses (a display apparatus, an operation apparatus, and the like) in a format which may be processed by an information processing apparatus 1. Moreover, an input I/F 1050 outputs signals to the external apparatus (the display apparatus) in a format which may be processed by the display apparatus.

First Embodiment

In a first embodiment, a method for measuring a position-orientation of a target object in accordance with accuracy information of contact positions of a robot hand and accuracy information of noncontact measurement data of a noncontact sensor is described. In this embodiment, a position-orientation is calculated focusing on the noncontact measurement data and the contact positions which have small error distributions taking characteristic of the error distributions which are the accuracy information of the noncontact measurement data and the accuracy information of the contact positions into consideration. By this, the position-orientation of the target object may be calculated with high accuracy.

In this embodiment, a noncontact sensor 1003 is attached to a robot arm 1001 having a robot hand 1002 attached thereto so as to measure a distance to a target object 1104 as illustrated in FIG. 1. When the target object 1104 is grasped by the robot hand 1002, an aggregation of range measurement points 1105 is measured as represented by a captured image 1101 of FIG. 2. The captured image 1101 is captured by an imaging device included in the noncontact sensor 1003. When the robot hand 1002 grasps the target object 1104, the noncontact sensor 1003 is positioned near the target object 1104, and therefore, it is highly likely that only a portion of the target object 1104 is measured as represented by the captured image 1101. In this case, even when the position-orientation of the target object 1104 having six degrees of freedom is to be calculated, it is likely that components of a position-orientation which are orthogonal to a surface of the captured image 1101 are not determined. Therefore, the calculation of a position-orientation of the target object 1104 is enabled using information on contact positions of the robot hand 1002 in addition to range measurement points 1105 in this embodiment. Furthermore, the position-orientation may be calculated with higher accuracy by calculating a position-orientation focusing on the noncontact measurement data and the contact positions having small error distributions taking the error distributions representing measurement accuracies of the range measurement points 1105 and contact points 1106 into consideration.

Configuration 1

FIG. 3 is a block diagram illustrating a configuration of the information processing apparatus 1. The configuration of the information processing apparatus 1 of this embodiment will be described hereinafter.

In this embodiment, a scene in which a target object 1104 installed in a predetermined position-orientation is grasped is simulated. When the target object 1104 is grasped, a position-orientation of the target object 1104 is shifted. Therefore, the position-orientation of the target object 1104 is calculated in accordance with noncontact measurement data and contact positions of the robot hand 1002.

The information processing apparatus 1 includes a data holding unit 102, an approximate position-orientation obtaining unit 103, a noncontact measurement data obtaining unit 104, a contact position obtaining unit 105, an accuracy obtaining unit 106, and a position-orientation calculation unit 107. Then a position-orientation of the target object 1104 is measured with high accuracy in accordance with accuracy of the contact positions of the robot hand 1102 and accuracy of the measurement data obtained by the noncontact sensor 1003. Furthermore, the information processing apparatus 1 transmits the calculated position-orientation to a robot controller 1005 and controls the robot arm hand 101 so that the robot arm hand 101 grasps the target object 1104. Note that the robot hand 1002 and the robot arm 1001 illustrated in FIG. 1 correspond to the robot arm hand 101 illustrated in FIG. 3.

The robot arm hand 101 includes the six-axis robot arm 1001 and the robot hand 1002 attached to a tip end of the robot arm 1001. The tip end of the robot arm 1001 may be moved in an input arbitrary position-orientation under control of the robot controller 1005. Furthermore, position-orientations of joints of the robot arm 1001 and a position-orientation of the robot hand 1002 in a reference coordinate system of the robot arm 1001 are output in accordance with information on joint angles of the robot arm 1001 and information on a shape of the robot arm hand 101. The robot hand 1002 opens and closes the robot hand 1002 in accordance with an instruction so as to grasp an object. The robot hand 1002 includes a contact sensor attached thereto which obtains information on contact positions of the grasping robot hand.

The noncontact sensor 1003 measures information on a distance to a point of a surface of the object to be measured. A noncontact sensor which outputs a range image having range values stored in individual pixels is used in this embodiment. The range image includes the pixels having depth information. As the noncontact sensor 1003, an active noncontact sensor which captures reflection light of pattern light emitted by a projector or the like to the target object 1104 by a camera so as to measure a distance by triangulation is used. However, the noncontact sensor 1003 is not limited to this, and a noncontact sensor employing a time-of-flight method using flight time of light may be used. These active noncontact sensors may be suitably employed when an object having less roughness on a surface thereof is to be measured. Alternatively, a noncontact sensor employing a passive method for calculating depths of pixels by triangulation from an image captured by a stereo camera may be employed. The passive noncontact sensor is suitably employed in a case where an object having large roughness on a surface thereof is to be measured. Furthermore, any noncontact sensor may be used as long as the noncontact sensor measures a range image since such a noncontact sensor does not run the essence of the present invention.

The data holding unit 102 holds information on a shape of the target object 1104 to be used when a position-orientation of the target object 1104 is estimated. In this embodiment, an aggregation of three-dimensional points on a surface of the target object 1104 corresponds to the shape information. The shape information of the target object 1104 is to be used by the position-orientation calculation unit 107. The data holding unit 102 further holds following information: (1) an approximate position-orientation of the target object 1104 in the reference coordinate of the robot arm 1001; (2) a relative position-orientation between the robot arm 1001 and the noncontact sensor 1003; (3) a relative position-orientation between a contact sensor attached to the robot hand 1002 and the robot hand 1002; and (4) calibration information, such as accuracy information of noncontact measurement data and accuracy information of the contact positions. The calibration information is measured in advance.

The approximate position-orientation obtaining unit 103 obtains an approximate position-orientation of the target object 1104 in the reference coordinate of the robot arm 1001. The approximate position-orientation of the target object 1104 is to be used by the position-orientation calculation unit 107. Furthermore, the approximate position-orientation of the target object 1104 is transmitted to the robot controller 1005 so as to be used for control of the robot arm hand 101.

The noncontact measurement data obtaining unit 104 obtains an aggregation of three-dimensional points in the reference coordinate of the robot arm 1001 as noncontact measurement data measured by the noncontact sensor 1003 attached to the robot arm 1001. The noncontact measurement data is to be used by the position-orientation calculation unit 107.

The contact position obtaining unit 105 obtains an aggregation of three-dimensional positions of contact positions of the robot hand 1002 obtained when contact is detected by the contact sensor attached to the robot hand 1002 in the reference coordinate of the robot arm 1001 (obtainment of contact position information). The obtained contact positions are to be used by the position-orientation calculation unit 107.

The accuracy obtaining unit 106 obtains accuracy information of a group of the three-dimensional points (the noncontact measurement data) obtained by the noncontact measurement data obtaining unit 104 and accuracy information of the three-dimensional positions of the contact positions obtained by the contact position obtaining unit 105. Here, the accuracy information corresponds to error distribution (variation values) of the three-dimensional points. Here, a normalized covariance matrix is used as the error distribution. The error distribution is obtained by performing measurement on an object in which a three-dimensional position thereof is recognized in advance a plurality of times in advance by the noncontact sensor 1003 and the contact sensor. In the error distribution, error distribution tables using a three-dimensional coordinate as a key are generated individually for noncontact measurement data and contact position data and are held in the data holding unit 102 as accuracy information. The held accuracy is to be used by the position-orientation calculation unit 107.

The position-orientation calculation unit 107 calculates a position-orientation of the target object 1104 (position orientation obtainment). Specifically, a position-orientation of the target object 1104 is calculated in accordance with the following information: (1) the shape information of the target object 1104 held by the data holding unit 102; (2) the approximate position-orientation of the target object 1104 obtained by the approximate position-orientation obtaining unit 103; (3) the noncontact measurement data obtained by the noncontact measurement data obtaining unit 104; (4) the contact positions of the robot hand 1002 obtained by the contact position obtaining unit 105; and (5) the accuracy of the noncontact measurement data and the accuracy of the contact positions of the robot hand 1002 obtained by the accuracy obtaining unit 106. Specifically, a position-orientation of the target object 1104 is calculated in accordance with a general iterative closest points (ICP) algorithm using the approximate position-orientation as an initial value. The calculated position-orientation is transmitted to the robot controller 1005 so that the robot arm hand 101 is controlled. In this way, assembly and arrangement of the target object 1104 are realized with high accuracy.

The functional units are realized when the CPU 1010 develops the programs stored in the ROM 1020 in the RAM 1030 and executes processes in accordance with flowcharts described below. Furthermore, in a case where hardware is configured as replacement of a software process using the CPU 1010, a calculation unit and circuits corresponding to processes of the functional units described herein are configured.

Processing Flow 1

A flow of a process performed by the information processing apparatus 1 of this embodiment will be described with reference to a flowchart of FIG. 4.

<Step S1010>

In step S1010, the shape information of the target object 1104 held in the data holding unit 102, that is, the aggregation of the three-dimensional points on the surface of the target object 1104, is obtained. The three-dimensional points are included in a reference coordinate system of the target object 1104.

<Step S1020>

In step S1020, the approximate position-orientation obtaining unit 103 obtains an approximate position-orientation of the target object 1104 in the reference coordinate of the robot arm 1001. Specifically, the approximate position-orientation obtaining unit 103 reads the approximate position-orientation of the target object 1104 in the reference coordinate of the robot arm 1001 held in the data holding unit 102.

<Step S1030>

In step S1030, the approximate position-orientation obtaining unit 103 transmits the approximate position-orientation of the target object 1104 obtained in step S1020 to the robot controller 1005. The robot controller 1005 controls the robot arm hand 101 so that the target object 1104 is grasped in predetermined positions.

<Step S1040>

In step S1040, the noncontact measurement data obtaining unit 104 obtains an aggregation of three-dimensional points in the reference coordinate of the robot arm 1001 as noncontact measurement data.

Specifically, the noncontact measurement data obtaining unit 104 obtains the group of the three-dimensional points from the noncontact sensor 1003 attached to the robot arm 1001. The group of the three-dimensional points obtained from the noncontact sensor 1003 is in a local coordinate system of the noncontact sensor 1003. Therefore, coordinates of the three-dimensional points in the local coordinate system of the noncontact sensor 1003 are transformed into those in the reference coordinate system of the robot arm 1001 in accordance with a relative position-orientation between the noncontact sensor 1003 and the robot arm 1001 and a position-orientation of the robot arm 1001 including the noncontact sensor 1003 attached thereto.

<Step S1050>

In step S1050, the contact position obtaining unit 105 obtains an aggregation of three-dimensional coordinates in positions in which the robot hand 1001 is in contact with the target object 1104 in the reference coordinate of the robot arm 1001 as contact positions. Specifically, the contact position obtaining unit 105 obtains positions in which the robot hand 1002 is in contact with the target object 1104 from the contact sensor, not illustrated, attached to the robot hand 1002. The contact positions obtained by the contact sensor correspond to three-dimensional points in a local coordinate system of the contact sensor. Therefore, the three-dimensional points in the local coordinate system of the contact sensor are transformed into those in the reference coordinate system of the robot arm 1001 in accordance with a relative position-orientation between the contact sensor and the robot hand 1002, a relative position-orientation between the robot arm 1001 and the robot hand 1002, and a position-orientation of the robot arm 1001.

<Step S1060>

In step S1060, the accuracy obtaining unit 106 obtains accuracy information of the noncontact measurement data obtained in step S1040 and the accuracy information of the contact positions obtained in step S1050. Specifically, error distribution corresponding to the three-dimensional points included in the aggregation of the three-dimensional points of the noncontact measurement data obtained in step S1040 is obtained as accuracy information of the three-dimensional points from the error distribution table of the noncontact measurement data which is accuracy information held by the data holding unit 102. Similarly, as for the contact positions, error distribution corresponding to the three-dimensional points included in the aggregation of the three-dimensional points of the contact positions obtained in step S1050 is obtained as accuracy information of the three-dimensional points from the error distribution table of the contact positions held by the data holding unit 102. The error distribution of the contact positions of the contact sensor spreads in a direction substantially orthogonal to normal lines on surfaces in the contact positions.

<Step S1070>

In step S1070, the position-orientation calculation unit 107 calculates a position-orientation of the target object 1104 in the reference coordinate of the robot arm 1001. The general ICP algorithm is used for the position-orientation calculation. The ICP algorithm is a method for calculating a relative position-orientation between two groups of N-dimensional points by repeatedly performing association and position-orientation calculation.

It is assumed that the noncontact measurement data and the contact positions in the reference coordinate of the robot arm 1001 which are obtained in step S1040 and step S1050, respectively, are determined as one of the groups of three-dimensional points. Furthermore, it is assumed that the group of the three-dimensional points in the reference coordinate system of the target object 1104 obtained in step S1010 is determined as the other of the groups of three-dimensional points. In this state, a position-orientation of the target object 1104 in the reference coordinate system of the robot arm 1001 may be calculated. Specifically, the calculation is performed by the following procedure.

It is assumed that the aggregation of the three-dimensional points of the noncontact measurement data in the reference coordinate of the robot arm 1001 obtained in step S1040 is denoted by "V" and the aggregation of the three-dimensional points of the contact positions in the reference coordinate of the robot arm 1001 obtained in step S1050 is denoted by "C". Furthermore, it is assumed that the position-orientation of the target object 1104 in the reference coordinate system of the robot arm 1001, that is, a transformation matrix for transformation from the reference coordinate system of the target object 1104 to the reference coordinate system of the robot arm 1001 is denoted by "M".

(1) The approximate position-orientation of the target object 1104 in the reference coordinate of the robot arm 1001 obtained in step S1020 is set as an initial value of the transformation matrix M.

(2) A three-dimensional point aggregation Q on the surface of the target object 1104 in the reference coordinate system of the target object 1104 obtained in step S1010 is subjected to coordinate transformation using the transformation matrix M. A three-dimensional point aggregation obtained after the transformation is denoted by "MQ".

(3) Neighborhood search is performed among the three-dimensional point aggregation V of the noncontact measurement data, the three-dimensional point aggregation C of the contact position, and the target-object-surface point aggregation MQ in the reference coordinate system of the robot arm 1001. It is assumed that a correspondence point aggregation between the aggregation V and the aggregation MQ is represented by "(v, q) is an element of Sv" and a correspondence point aggregation between the aggregation C and the aggregation MQ is represented by "(c, q) is an element of Sc". Here, the following expressions are satisfied: "v is an element of V"; "c is an element of C"; and "q is an element of MQ".

(4) Assuming that the corresponding three-dimensional points are denoted by "p" and "q", a correspondence distance e is represented by the following expression.

$$e(p,q) = \|p-q\| \quad \text{[Math.1]}$$

Error distributions of the aggregations V and C obtained in step S1060, that is, normalized covariance matrices, are denoted by $\Sigma v_i$ and $\Sigma c_j$, respectively. Then a transformation matrix M' which maximizes the following expression is calculated by the maximum likelihood estimation.

$$L = \prod_{(p,q) \in Sv} N\left(e(p,q), \sum v_p\right) \prod_{(p,q) \in Sc} N\left(e(p,q), \sum c_p\right) \quad \text{[Math. 2]}$$

Here, "N(e, $\Sigma$)" denotes normalized distributions of the normalized covariance matrices $\Sigma$.

(5) The transformation matrix M' obtained in (4) is assigned to the transformation matrix M, and the process from (2) to (5) is repeatedly performed until the transformation matrix M is converged.

By the calculation described above, the transformation matrix M used for the transformation from the reference coordinate system of the target object 1104 to the reference coordinate system of the robot arm 1001, that is, a position-orientation of the target object 1104 in the reference coordinate system of the robot arm 1001, is calculated.

The three-dimensional points measured by the noncontact sensor 1003 in stereo measurement, such as active stereo or passive stereo, form oval error distributions extending in a depth direction as denoted by range measurement points 1105 illustrated in a side view 1102 of FIG. 2. If a position-orientation of the target object 1104 having the six degrees of freedom is to be calculated only using an aggregation of the range measurement points 1105, components of the position-orientation which are orthogonal to the captured image surface may not be determined in the scene in which only a portion of the target object 1104 may be measured as illustrated in FIG. 2.

On the other hand, although accuracy of the contact points 1106 in a normal direction of a surface of the robot hand 1002 in which the contact sensor is installed is high, accuracy in a direction orthogonal to the normal direction is low. Therefore, error distribution of the contact points 1106 spreads in the direction orthogonal to the normal line on the surface of the robot hand 1002 as illustrated in FIG. 2. In this embodiment, the position-orientation of the target object 1104 is calculated simultaneously using the range measurement points 1105 and the contact points 1106 which have the error distribution having a tendency different from that of the range measurement points 1105. Since the accuracy information (the error distribution) of the noncontact measurement data of the noncontact sensor 1003 and the accuracy information (the error distribution) of the contact positions of the robot hand 1002 having different tendencies are taken into consideration, the position-orientation of the target object 1104 may be calculated with high accuracy since characteristics of the accuracy information (the error distributions) are mutually compensated for.

Modification 1

In the configuration described above, the noncontact measurement data obtaining unit 104 obtains a group of three-dimensional points measured by the noncontact sensor 1003. However, the noncontact measurement data obtaining unit 104 may obtain an image feature extracted from an image captured by a camera. In a case where the image feature is edge points, for example, the present invention is particularly effective in a scene illustrated in FIG. 5. Although accuracy of edge points is low in an edge direction detected from the image, the accuracy is high in a direction orthogonal to the edge direction as represented by ovals of the edge points 1205 illustrated in a side view 1202 of FIG. 5. Furthermore, in a depth direction of an image surface, no information is determined from a single edge point and error distribution infinitely spreads in the depth direction. In the scene of FIG. 5, in a case where a position-orientation is calculated only using the edge points, although accuracy of position-orientation components which are orthogonal to a captured image 1201 is high, accuracy of the position-orientation components in the depth direction of the image surface is low. Here, taking error distribution of contact points 1206 of a robot hand 1002 which grasps a target object 1104 as illustrated in FIG. 5 into consideration, as with the method described above, a position-orientation of the target object 1104 is calculated simultaneously using error distribution of the edge points 1205 and the error distribution of the contact points 1206. By this, the position-orientation of the target object 1104 may be calculated with high accuracy while characteristics of the error distributions (accuracy information) are mutually compensated for.

Furthermore, a noncontact sensor 1003 and a camera are attached to a robot arm 1001 so that both of a three-dimensional point group supplied from the noncontact sensor 1003 and an image feature supplied from the camera may be obtained as noncontact measurement data by a noncontact measurement data obtaining unit 104.

The example in which a position-orientation of the target object 1104 is calculated with high accuracy simultaneously using the noncontact measurement data and the contact positions using the maximum likelihood estimation utilizing the error distributions is illustrated in the foregoing configuration. However, the maximum likelihood estimation may not be used as a method for calculating a position-orientation of the target object 1104 simultaneously using the noncontact measurement data and the contact positions. For example, a position-orientation of the target object 1104 may be calculated by weighted least-squares or the like using distribution of errors of the noncontact measurement data and distribution of errors of the contact points as weights. The weights may be determined in accordance with, in addition to the distribution, reliability of detection of image features and geometric features, such as range measurement points, signal intensity for detecting the contact points, or the number of detected points.

With the configuration described above, a position-orientation is calculated focusing on the noncontact measurement data and the contact positions having small error distributions taking the accuracy information (the error distribution) of the noncontact measurement data and the accuracy information (the error distribution) of the contact positions of the robot hand 1002 having different tendencies into consideration. By this, a position-orientation of the target object 1104 may be calculated with high accuracy while characteristics of the accuracy information (the error distributions) are mutually compensated for.

Second Embodiment

In a second embodiment, a method for calculating a position-orientation of a target object 1104 by changing measurement data in accordance with accuracy information of contact positions of a robot hand 1002 and accuracy information of noncontact measurement data of a noncontact sensor 1003 so that only data having high accuracy is used will be described.

Measurement accuracy of the noncontact sensor 1003 is likely to be degraded in a case where an object having low reflection luminance, a moving object, or an object out of a measurement available range is measured. Furthermore, measurement accuracy of a contact sensor attached to the robot hand 1002 may also be degraded in a case where a grasped object is slipped or flexible. If a position-orientation of the target object 1104 is calculated using unreliable measurement data of low accuracy, an inappropriate position-orientation may be calculated. Therefore, in this embodiment, a method for calculating a position-orientation of the target object 1104 with high accuracy by changing data to be used in accordance with accuracy of contact positions and accuracy of noncontact measurement data obtained by the noncontact sensor 1003 even if measurement data of low accuracy is mixed will be described.

Configuration 2

A configuration of this embodiment is illustrated in FIG. 6. Only differences from the first embodiment will be described.

A noncontact measurement data obtaining unit 204 obtains an aggregation of three-dimensional points in a reference coordinate of a robot arm 1001 and an aggregation of measurement reliabilities thereof as noncontact measurement data measured by the noncontact sensor 1003 attached to the robot arm 1001. The smaller a value of the measurement reliability is, the higher the reliability is. A time-of-flight (TOF) sensor, for example, is capable of calculating the measurement reliabilities in accordance with reflection intensity or the like, and a stereo sensor, for example, is capable of calculating the measurement reliabilities in accordance with a matching degree of pattern matching or the like.

A contact position obtaining unit 205 obtains an aggregation of three-dimensional points of the contact positions of the robot hand 1002 in the reference coordinate of the robot arm 1001 and an aggregation of measurement reliabilities obtained when contact is detected by the contact sensor attached to the robot hand 1002. The smaller a value of the measurement reliability is, the higher the reliability is. The reliability of the contact sensor may be calculated in accordance with intensity, distribution, or the like of signals detected by the contact sensor.

An accuracy obtaining unit 206 sets the measurement reliability obtained by the noncontact measurement data obtaining unit 204 as accuracy of a group of the three-dimensional points obtained by the noncontact measurement data obtaining unit 204. Similarly, the accuracy obtaining unit 206 sets the measurement reliability obtained by the contact position obtaining unit 205 as accuracy of the three-dimensional positions of the contact positions obtained by the contact position obtaining unit 205.

A position-orientation calculation unit 207 calculates a position-orientation of the target object 1104. Specifically, as with the first embodiment, the position-orientation calculation unit 207 calculates a position-orientation of the target object 1104 in accordance with the following information: (1) shape information of the target object 1104 held by a data holding unit 202; (2) an approximate position-orientation of the target object 1104 obtained by an approximate position-orientation obtaining unit 203; (3) the noncontact measurement data obtained by the noncontact measurement data obtaining unit 204; (4) the contact positions of the robot hand 1002 obtained by the contact position obtaining unit 205; and (5) the accuracy of the noncontact measurement data and the accuracy of the contact positions of the robot hand 1002 obtained by the accuracy obtaining unit 206. Note that, here, the position-orientation calculation unit 207 calculates a position-orientation of the target object 1104 by selecting data to be used for the calculation of a position-orientation in accordance with the accuracy obtained by the accuracy obtaining unit 206.

Processing Flow 2

A processing flow of this embodiment is similar to the flowchart of the first embodiment illustrated in FIG. 4, and only differences are described hereinafter.

The process from step S1010 to step S1030 of the first embodiment is similarly performed.

<Step S1040>

In step S1040, the noncontact measurement data obtaining unit 204 obtains an aggregation of three-dimensional points in the reference coordinate of the robot arm 1001 and an aggregation of measurement reliabilities thereof as noncontact measurement data. As with the first embodiment, coordinates of the three-dimensional points in a local coordinate system of the noncontact sensor 1003 are transformed into those in the reference coordinate system of the robot arm 1001 in accordance with a relative position-orientation between the noncontact sensor 1003 and the robot arm 1001 and a position-orientation of the robot arm 1001 including the noncontact sensor 1003 attached thereto.

<Step S1050>

In step S1050, the contact position obtaining unit 205 obtains an aggregation of three-dimensional coordinates in positions in which the robot hand 1002 is in contact with the target object 1104 in the reference coordinate of the robot arm 1001 as contact positions and an aggregation of measurement reliabilities thereof. As with the first embodiment, the three-dimensional points of the contact positions in the local coordinate system are transformed into those in the reference coordinate system of the robot arm 1001 in accordance with a relative position-orientation between the contact sensor and the robot hand 1002, a relative position-orientation between the robot arm 1001 and the robot hand 1002, and a position-orientation of the robot hand 1002.

<Step S1060>

In step S1060, the accuracy obtaining unit 206 sets measurement reliabilities as accuracy of the noncontact measurement data obtained in step S1040 and accuracy of the contact positions obtained in step S1050.

<Step S1070>

In step S1070, the position-orientation calculation unit 207 calculates a position-orientation of the target object 1104 in the reference coordinate of the robot arm 1001. As with the first embodiment, the ICP algorithm is used for the position-orientation calculation. Note that only noncontact measurement data having accuracy larger than a predetermined threshold value t1 is used for the position-orientation calculation. Furthermore, only contact points having accuracy larger than a predetermined threshold value t2 are used. Therefore, assuming that an aggregation of correspondence points between the noncontact measurement data having the accuracy larger than the threshold value t1 and target-object surface points is represented by "(v, q) is an element of Sv'" and an aggregation of correspondence points between the contact points and the target-object surface points is represented by "(c, q) is an element of Sc'", a transformation matrix M' which minimizes the following expression may be calculated by the least-squares estimation.

$$L = \sum_{(p,q) \in Sv'} e(p, q) \sum_{(p,q) \in Sc'} e(p, q) \qquad \text{[Math. 3]}$$

By the process described above, a position-orientation of the target object 1104 may be calculated with high accuracy by changing data to be used in accordance with accuracy of contact positions and accuracy of noncontact measurement data obtained by the noncontact sensor 1003 even if measurement data of low accuracy is mixed.

Modification 2

In the second embodiment, points to be used for the position-orientation calculation are selected by checking accuracy for each noncontact measurement data and each contact point. However, a position-orientation may be calculated only using contact points without using entire noncontact measurement data if mean accuracy, minimum accuracy, and maximum accuracy of the noncontact measurement data which have been checked are larger than a predetermined threshold value. Conversely, if the mean accuracy and the like of the contact points are larger than the predetermined threshold value, a position-orientation may be calculated only using the noncontact measurement data. Moreover, if both of the accuracy of the noncontact measurement data and the accuracy of the contact points are smaller than the respective threshold values, at least one of the noncontact measurement data and the contact positions may be measured again so that the accuracy is obtained again and a position-orientation is calculated again. In addition, only one of the noncontact measurement data and the contact points which has higher accuracy may be used.

With the configuration described above, a position-orientation of the target object 1104 may be calculated with high accuracy by changing data so that only data having high accuracy is used in accordance with the accuracy of the noncontact measurement data and the accuracy of contact positions of the robot hand 1002 even if measurement data of low accuracy is mixed.

Third Embodiment

In a third embodiment, a method for calculating a position-orientation of a target object 1104 with higher accuracy by determining positions where the target object 1104 is grasped such that ambiguity of a position-orientation calculated in accordance with contact positions of a robot hand 1002 and noncontact measurement data of a noncontact sensor 1003 is reduced will be described.

An apparatus configuration of this embodiment is the same as that of the first embodiment illustrated in FIG. 1. In this embodiment, the target object 1104 is grasped and touched after grasping positions on the target object 1104 are determined such that smaller ambiguity of a calculated position-orientation is obtained and measurement accuracy of range measurement points 1105 and measurement accuracy of contact points 1106 are taken into consideration.

In this embodiment, a scene in which one of piled objects is grasped as a target object 1104 is estimated. An approximate position-orientation of the object to be grasped is obtained by performing noncontact measurement on the piled objects, and grasping positions are determined before the target object 1104 is grasped. When the target object 1104 is grasped, a position-orientation of the target object 1104 is shifted. Therefore, the position-orientation of the target object 1104 is calculated in accordance with noncontact measurement data and contact positions of the robot hand 1002.

Configuration 3

FIG. 7 is a block diagram illustrating a configuration of an information processing apparatus 3 according to this embodiment. The configuration of the information processing apparatus 3 of this embodiment will now be described.

As with the first embodiment, the information processing apparatus 3 transmits a calculated position-orientation to a robot controller 1005 and controls a robot arm hand 101 so that the robot arm hand 101 grasps a target object 1104. The information processing apparatus 3 includes a contact position determination unit 308 in addition to a data holding unit 302, an approximate position-orientation obtaining unit 303, a noncontact measurement data obtaining unit 304, a contact position obtaining unit 305, an accuracy obtaining unit 306, and a position-orientation calculation unit 307.

In the configuration of the information processing apparatus 3, only differences from the first embodiment will be described.

The approximate position-orientation obtaining unit 303 obtains an approximate position-orientation of the target object 1104 in a reference coordinate of the robot arm 1001. Here, the noncontact sensor 1003 attached to the robot arm 1001 performs three-dimensional measurement on a scene including the target object 1104 so that a position-orientation of the target object 1104 is detected from an aggregation of obtained three-dimensional points in the reference coordinate of the robot arm 1001. The contact position determination unit 308 determines grasping positions of the target object 1104. Information on the determined grasping positions is supplied to the robot controller 1005 so as to be used for control of the grasping of the target object 1104.

Processing Flow 3

A flow of a process performed by the information processing apparatus 3 of this embodiment will be described with reference to a flowchart of FIG. 8. Note that the processing flow of this embodiment is similar to the flowchart of the first embodiment illustrated in FIG. 4, and only differences are described hereinafter.

A process from step S3040 to step S3070 is the same as the process from step S1040 to step S1070 in the first embodiment.

<Step S3010>

In step S3010, the approximate position-orientation obtaining unit 303 obtains information on a shape of the target object 1104 held in the data holding unit 302, that is, an aggregation of three-dimensional points and normal lines on a surface of the target object 1104. The three-dimensional points are included in a reference coordinate system of the target object 1104. Next, a dictionary to be used for recognition of the target object 1104 to be performed in step S3020 is generated. A recognition method using spin images is utilized for detection of the target object 1104. A spin-images feature value is a local feature value calculated using a range image and a group of three-dimensional points. Therefore, the spin-images feature value is extracted from the shape information of the target object 1104 and held as the dictionary. Note that a dictionary which is generated in advance and stored in the data holding unit 302 may be read. The recognition method using the spin images are disclosed in NPL 2.

<Step S3020>

In step S3020, the approximate position-orientation obtaining unit 303 obtains an approximate position-orientation of the target object 1104 in the reference coordinate of the robot arm 1001. Specifically, the noncontact sensor 1003 attached to the robot arm 1001 performs three-dimensional measurement on a scene including the target object 1104 and a position-orientation of the target object 1104 is detected from an aggregation of obtained three-dimensional points in the reference coordinate of the robot arm 1001. As described above, the recognition method using spin images is utilized for detection of the target object 1104. A spin-images feature value is extracted from the aggregation of the measured three-dimensional points and compared with the dictionary generated in step S3010 so that a position-orientation of the target object 1104 is calculated. Furthermore, the calculated position-orientation is used as an initial value and the position-orientation of the target object 1104 is refined by applying the ICP algorithm to the shape information the target object 1104 and the aggregation of the measured three-dimensional points so that an approximate position-orientation is obtained. Here, the three-dimensional points and the normal lines on the surface of the target object 1104 are determined as a local plane, distances between the measured three-dimensional points and the plane which are associated with each other are minimized so that a position-orientation of the target object 1104 is calculated.

<Step S3025>

In step S3025, the contact position determination unit 308 determines grasping positions of the target object 1104. Using the aggregation (measurement data) of the three-dimensional points obtained through the three-dimensional measurement performed by the noncontact sensor 1003 used when the approximate position-orientation is calculated in step S3020, ambiguity of the approximate position-orientation is calculated, and grasping positions which attain disambiguation is determined.

The ambiguity of the approximate position-orientation is calculated by obtaining a Jacobian matrix from the shape information of the target object 1104 (the aggregation of the three-dimensional points and the normal lines on the surface of the target object 1104) and the aggregation (measurement data) of the measured three-dimensional points. The Jacobian matrix is a value indicating a degree of change of parameters of six degrees of freedom of a position-orientation obtained when a correspondence distance of geometric features which are focused on when a position-orientation of the target object 1104 is to be calculated is changed. Specifically, the Jacobian matrix uses first-order partial derivatives of elements of a position and an orientation as elements in a case where distances between points in a three-dimensional space and a plane are set as functions of the position and the orientation. When the Jacobian matrix of the geometric feature is checked, one of the parameters of the six degrees of freedom of the position-orientation which is likely to be affected by the geometric feature is recognized. In a case where a specific parameter of the Jacobian matrix is small, influence on the parameter is small, that is, positioning fails since the parameter is not determined or positioning may not be performed with sufficient accuracy. Hereinafter, a method for obtaining the Jacobian matrix of a geometric feature will be described.

A method for modeling the relationship between an accidental error of the measurement data, a data amount, space distribution, and an accidental error of the position-orientation calculation as propagation to an accidental error of a result of position-orientation estimation caused by the accidental error of the measurement data has been proposed in NPL 3.

As described in step S3020, the calculation of a position-orientation is performed in accordance with the ICP algorithm in which the three-dimensional points and the normal lines (shape information) on the surface of the target object 1104 are determined as a local plane and a distance between the local plane and the associated measured three-dimensional points (measurement data) is minimized. Here, the measurement data is data of the reference coordinate system of the robot arm 1001 and the shape information of the target object 1104 is data of the reference coordinate system of the target object 1104. It is assumed that three-dimensional coordinates of the three-dimensional positions of surface points representing the shape information of the target object 1104 and the normal lines in the reference coordinate system of the robot arm 1001 are denoted by "$(x, y, z)^T$", normal line directions are denoted by "$(n_x, n_y, n_z)^T$" (a unit vector), and coordinates of the three-dimensional points of the measurement data are denoted by "$(x', y', z')^T$". In this case, a signed distance e in the three-dimensional space represented by Math. 1 may be calculated by the following expression: $e=n_x(x'-x)+n_y(y'-y)+n_z(z'-z)$.

Then the correspondence distance e is subjected to partial differentiation using a transformation parameter $s=(s1, s2, s3, s4, s5, s6)^T$ for transformation from the reference coordinate system of the target object 1104 to the reference coordinate system of the robot arm 1001 so that a Jacobian matrix $J_{3D}$ is calculated as follows.

$$J_{3D}=[n_x\ n_y\ n_z\ (n_z\tilde{y}-n_y\tilde{z})\ (n_x\tilde{z}-n_z\tilde{x})\ (n_y\tilde{x}-n_x\tilde{y})] \quad \text{[Math.4]}$$

Here, in Expression 5 below,

"$\tilde{R}$"

indicates an orientation transformation matrix for transformation from the reference coordinate system of the target object 104 to the reference coordinate system of the robot arm 1001, and "$(x_m, y_m, z_m)^T$" represents coordinates of the three-dimensional points of the shape information in the reference coordinate system of the target object 1104. When a Jacobian matrix J of m rows by 6 columns obtained by connecting the m Jacobian matrices $J_{3D}$ of 1 row by 6 columns (m is the number of correspondence points) is used, a minor change between the position-orientation and the observation data may be represented as an error function of a first-order approximation of (a minor change Δ of) the position-orientation as represented by Math. 7. This is a relational expression representing a minor change of an observation data position caused by a minor change of a position-orientation.

$$\begin{bmatrix} \tilde{x} \\ \tilde{y} \\ \tilde{z} \end{bmatrix} = \tilde{R} \begin{bmatrix} x_m \\ y_m \\ z_m \end{bmatrix} \quad \text{[Math. 5]}$$

$$\tilde{R} \quad \text{[Math. 6]}$$

$$J\Delta = e\ \ \Delta = J^+ e\ \left(J^+ = (J^T J)^{-1} J^T\right) \quad \text{[Math. 7]}$$

Using this expression, a covariance matrix Cov(Δ) of the position-orientation is calculated from a covariance matrix Cov(e) of the measurement data in accordance with a framework of error back propagation. Standard deviations of the three-dimensional points of the measurement data are obtained from the accuracy obtaining unit 306 as accuracy of the measurement data and are set as "$\sigma_{rangej}$". The covariance matrix Cov(e) is represented by Math. 8 below using "$\sigma_{rangej}$".

$$\text{Cov}(e) = \begin{bmatrix} \sigma^2_{range\ j} & & 0 \\ & \ddots & \\ 0 & & \sigma^2_{range\ M} \end{bmatrix} \quad \text{[Math. 8]}$$

The covariance Cov(Δ) of the position-orientation is calculated using the covariance Cov(e) of the measurement data and the Jacobian matrices J corresponding to the measurement data as follows.

$$\begin{aligned} \text{Cov}(\Delta) &= E[\Delta\Delta^T] \quad \text{[Math. 9]} \\ &= E[J^+ e(J^+ e)^T] \\ &= J^+ E[ee^T](J^+)^T \\ &= J^+ \text{Cov}(e)(J^+)^T \end{aligned}$$

In accordance with this expression, the covariance matrix Cov(Δ) representing ambiguity of an estimated position-orientation parameter is calculated. A maximum eigenvector u of the covariance matrix Cov(Δ) represents the most ambiguous direction of a position-orientation among position-orientations calculated as approximate position-orientations.

The grasping positions of the target object 1104, that is, the contact points used for the position-orientation calculation in step S3070, have error distribution which spreads in directions orthogonal to normal lines of a surface of a robot hand 1002 as represented by the range measurement points 1105 in FIG. 2. Therefore, to reduce the ambiguity of the position-orientation calculation, points having normal lines nearest to the maximum eigenvector u are selected from the shape information of the target object 1104 so as to be determined as the grasping positions.

<Step S3030>

In step S3030, the contact position determination unit 308 supplies the grasping positions determined in step S3025 and the approximate position-orientation of the target object 1104 obtained in step S3020 to the robot controller 1005 which controls the robot arm hand 101 so that the target object 1104 is grasped.

<Step S3070>

In step S3070, the position-orientation calculation unit 307 calculates a position-orientation of the target object 1104 by the same process as step S3010. Note that a transformation matrix M' which maximizes Math. 3 is calculated by the maximum likelihood estimation using the correspondence distance e as a measured three-dimensional point (measurement data) associated with the local plane represented by the three-dimensional points and the normal lines (the shape information) on the surface of the target object 1104.

<Step S3080>

In step S3080, the position-orientation calculation unit 307 calculates a covariance matrix representing the ambiguity of the position-orientation calculated in step S3070 by the method described in step S3025. Note that, in step S3070, both of the noncontact measurement data and the contact points are used as the measurement data for calculation of the position-orientation, and therefore, both of the noncontact measurement data and the contact points are used also for calculation the ambiguity. If the maximum eigenvalue (representing distribution in a direction of the largest variation of the calculated position-orientation) of the calculated covariance matrix is equal to or smaller than a predetermined threshold value, the calculation of the position-orientation is terminated, and otherwise, the process returns to step S3020 so that the measurement is performed again.

In this way, the target object 1104 is grasped and touched after the grasping positions on the target object 1104 are determined such that smaller ambiguity of a calculated position-orientation is obtained and the position-orientation of the target object 1104 may be calculated with high accuracy taking accuracy of the noncontact measurement data and accuracy of the contact positions of the robot hand 1002 having different tendencies into consideration.

Modification 3

In the method for determining grasping positions in step S3025, grasping positions are determined only using ambiguity of a calculated position-orientation. However, the shape information of the robot hand 1002 may be additionally used so that it is determined whether the target object 1104 may be grasped in the determined grasping positions. For example, simulation may be performed using the shape information of the robot hand 1002, the position-orientation of the target object 1104, the shape information of the target object 1104, and the three-dimensional measurement data of the scene so as to determine whether the target object 1104 may be grasped in the calculated grasping positions, and the normal lines of the aggregation of the surface points of the target object 1104 may be checked starting from one of the normal lines which is nearest to the maximum eigenvector u.

With this configuration described above, since the target object 1104 is grasped in the grasping positions such that smaller ambiguity of a calculated position-orientation is obtained, the noncontact measurement data and the contact positions of the robot hand 1002 which have different tendencies may be reliably obtained, and accordingly, the position-orientation of the target object 1104 may be calculated with high accuracy.

Fourth Embodiment

In a fourth embodiment, a contact position is added by controlling a robot hand 1002 such that ambiguity of a position-orientation calculated from the contact positions of the robot hand 1002 and noncontact measurement data of a noncontact sensor 1003 is reduced after a target object 1104 is grasped. A method for calculating a position-orientation with high accuracy in this way will now be described.

A configuration of an apparatus of this embodiment is illustrated in FIG. 9. In the method described in this embodiment, a point or a plane on a surface of a target object 1104 is determined such that smaller ambiguity of a calculated position-orientation of the target object 1104 is obtained and the target object 1104 is touched by a contact finger 3007 included in the robot hand 1002 in the point or the plane, so that a contact position is added. A position-orientation is calculated again using an aggregation of the added contact position and contact positions obtained before the addition and noncontact measurement data obtained by a noncontact sensor 1003 so that a position-orientation of the target object 1104 is calculated with higher accuracy.

As with the third embodiment, in this embodiment, a scene in which one of piled objects is grasped as a target object 1104 is estimated. An approximate position-orientation of the object to be grasped is obtained by performing noncontact measurement on the piled objects, and grasping positions are determined before the target object 1104 is grasped. When the target object 1104 is grasped, a position-orientation of the target object 1104 is shifted. Therefore, the position-orientation of the target object 1104 is calculated in accordance with noncontact measurement data and contact positions of the robot hand 1002.

Configuration 4

A configuration of this embodiment is the same as that of the third embodiment illustrated in FIG. 7, and only differences are described hereinafter.

As with the third embodiment, the contact position determination unit 308 determines grasping positions of the target object 1104. Furthermore, the contact position determination unit 308 determines a position to be touched by the contact finger 3007 so as to additionally obtain a contact position. Information on the determined grasping positions and information on the contact position is supplied to the robot controller 1005 so as to be used for control of the grasping and touching of the target object 1104.

Processing Flow 4

A flow of a process performed by an information processing apparatus 4 of this embodiment will be described with reference to the flowchart of FIG. 8. The processing flow of this embodiment is similar to that of the third embodiment, and only differences are described hereinafter.

A process in step S3010 is the same as that of the third embodiment. A first loop of a process from step S3020 to step S3080 is the same as that of the third embodiment. However, after a second loop onwards, a target object 1104 is not grasped again but a contact position is additionally determined by bringing the contact finger 3007 to contact with the target object 1104. Processes in steps in the second loop onwards will be described hereinafter.

<Step S3020>

In step S3020, the approximate position-orientation obtaining unit 303 obtains an approximate position-orientation of a target object 1104 in a reference coordinate of a robot arm 1001. Specifically, a position-orientation of the target object 1104 calculated in step S3070 in a preceding loop is set as an approximate position-orientation.

<Step S3025>

In step S3025, the contact position determination unit 308 determines a contact position of the target object 1104. The contact position determination unit 308 calculates ambiguity of the position-orientation of the target object 1104 calculated in step S3070 in the preceding loop which is set as the approximate position-orientation and determines a contact position which attains disambiguation. That is, a Jacobian matrix is obtained from noncontact measurement data, the contact positions, and shape information of the target object 1104 (an aggregation of three-dimensional points and normal lines on a surface of the target object 1104) which have been used for calculation of a position-orientation of the target object 1104 so that the ambiguity is calculated. A method for calculating the contact position is the same as the method for calculating the grasping positions in step S3025 according to the third embodiment.

<Step S3030>

In step S3030, the contact position determined in step S3025 and the approximate position-orientation of the target object 1104 obtained in step S3020 are supplied to the robot controller 1005 which controls the robot arm hand 101 so that a finger of the robot hand 1002 touches the surface of the target object 1104.

<Step S3040>

In step S3040, the noncontact measurement data obtaining unit 304 obtains an aggregation of three-dimensional points in the reference coordinate of the robot arm 1001 as noncontact measurement data. Note that noncontact measurement data obtained in the preceding processing loop may be stored so as to be utilized again.

<Step S3050>

In step S3050, the contact position obtaining unit 305 obtains a position which is touched by the robot hand 1002 in step S3030. An aggregation of three-dimensional coordinates obtained by adding the obtained contact position to the contact positions obtained in the preceding loop is output as contact positions to be used in the following steps.

<Step S3060>

In step S3060, the accuracy obtaining unit 306 obtains accuracy of the noncontact measurement data obtained in step S3040 and accuracy of the contact positions obtained in step S3050.

<Step S3070>

In step S3070, as with the third embodiment, the position-orientation calculation unit 307 calculates a position-orientation of the target object 1104.

<Step S3080>

In step S3080, as with the third embodiment, the position-orientation calculation unit 307 calculates a covariance matrix representing the ambiguity of the position-orientation calculated in step S3070 by the method described in step S3025. If the maximum eigenvalue (representing distribution in a direction of the largest variation of the calculated position-orientation) of the calculated covariance matrix is equal to or smaller than a predetermined threshold value, the calculation of a position-orientation is terminated, and otherwise, the process returns to step S3020 so that another contact position is measured.

In this way, a position-orientation of the target object 1104 may be calculated by successively adding contact positions on the target object 1104 such that smaller ambiguity of the calculated position-orientation is obtained and a position-orientation of the target object 1104 may be calculated with high accuracy.

Variation

In the fourth embodiment, a contact position is added using the contact finger 3007 as illustrated in FIG. 8. However, a device to be used to add a contact position is not limited to this. If a plurality of robot arms 1002 are used, one of the robot arms 1002 which is not grasping a target object 1104 may be used to add a contact position. Furthermore, if the target object 1104 is not moved when being touched, a contact position may be added without grasping the target object 1104.

With the configuration described above, a contact position on the target object 1104 is successively added such that smaller ambiguity of a calculated position-orientation is obtained. By this, the noncontact measurement data and the contact positions of the robot hand 1002 which have different tendencies may be reliably obtained, and accordingly, a position-orientation of the target object 1104 may be calculated with high accuracy.

Other Embodiments

The present invention may also be realized by executing the following process. Specifically, software (programs) which realizes the functions of the foregoing embodiments is supplied to a system or an apparatus through a network or various storage media, and a computer (or a CPU, an MPU, or the like) of the system or the apparatus reads and executes the programs.

Effects of Embodiments

In the first embodiment, a position-orientation is calculated focusing on the noncontact measurement data and the contact positions having small error distributions taking the accuracy (error distribution) of the noncontact measurement data and the accuracy (error distribution) of the contact positions of the robot hand 1002 having different tendencies into consideration. By this, a position-orientation of the target object 1104 may be calculated with high accuracy without increasing the number of measurement apparatuses while characteristics of the accuracy information (the error distributions) are mutually compensated for.

In the second embodiment, the measurement data is changed so that only data having high accuracy is used in accordance with the accuracy of the noncontact measurement data and the accuracy of the contact positions of the robot hand 1002. By this, a position-orientation of the target object 1104 may be calculated with high accuracy without increasing the number of measurement apparatuses even if measurement data of low accuracy is mixed.

In the third embodiment, the target object 1104 is grasped in positions on the target object 1104 such that smaller ambiguity of a calculated position-orientation is obtained. By this, the noncontact measurement data and the contact positions of the robot hand 1002 which have different tendencies may be reliably obtained, and accordingly, the position-orientation of the target object 1104 may be calculated with high accuracy without increasing the number of measurement apparatuses.

In the fourth embodiment, a contact position on the target object 1104 is successively added such that smaller ambiguity of a calculated position-orientation is obtained. By this, the noncontact measurement data and the contact positions of the robot hand 1002 which have different tendencies may be reliably obtained, and accordingly, a position-orientation of the target object 1104 may be calculated with high accuracy without increasing the number of measurement apparatuses.

Definitions

The robot controller 1005 at least controls a movement of the robot arm 1001 and the robot hand 1002 to an arbitrary position-orientation and a grasping operation and outputs a state of a robot including position-orientations and joint angles of the robot arm 1001 and the robot hand 1002. The robot controller 1005 may control the robot arm hand 101 by receiving a position-orientation of a tip end of the robot arm 1001, a position-orientation of an object to be grasped, and information on joint angles of the robot arm 1001.

Any shape of the robot arm 1001 may be employed as long as the robot has at least one operation portion. A plurality of arms may be provided or a plurality of robots may be provided. A six-axis robot, a scholar robot, or a parallel link robot may be used, and a shape of the robot is not restricted. Alternatively, an unsubstantial robot in simulation may be used.

The robot hand 1002 has a mechanism for grasping a component, and the mechanism may have any configuration as long as the mechanism detects grasping and contacting. A mechanism of two fingers or multi-fingers may be used or a mechanism of a suction hand may be employed. A finger for contact measurement may be provided. Alternatively, an unsubstantial robot hand in simulation may be used.

The data holding unit at least holds information on a shape of the target object 1104, information on a shape of the robot arm 1001, and calibration information which are to be used for estimation of a position-orientation of the target object 1104. The information on the shape of the target object 1104 may be an aggregation of geometric features, such as three-dimensional points and normal lines. The information on the shape of the target object 1104 may represent a three-dimensional mesh model or an analytic curved surface model, such as a CAD model. The calibration information may be the following information: an approximate position-orientation of the target object 1104 in the reference coordinate of the robot arm 1001; a relative position-orientation between the robot arm 1001 and the noncontact sensor 1003; a relative position-orientation between the contact sensor attached to the robot hand 1002 and the robot hand 1002; and information on accuracy of noncontact measurement data, information on accuracy of contact positions, a camera parameter of the measurement apparatus, and the like. The data holding unit may be any form, such as an HDD, an SSD, a memory, and a tape drive, as long as the data holding unit is capable of holding data.

The approximate position-orientation obtaining unit at least obtains an approximate position-orientation of the target object 1104 in the reference coordinate of the robot arm 1001. The approximate position-orientation obtaining unit may read a position-orientation from the data holding unit or may obtain a position-orientation of the target object 1104 from measurement data obtained by measuring the target object 1104 by the noncontact sensor 1003 or a camera attached to the robot arm 1001 or installed in an environment. A recognition method based on feature values, such as spin images, or a method based on template matching may be used for calculation of a position-orientation using measurement data. Alternatively, a model fitting method using the ICP algorithm or the like may be used.

The noncontact measurement data obtaining unit at least obtains noncontact measurement data of the target object 1104 in the reference coordinate of the robot arm 1001. The noncontact measurement data may be measured by the noncontact sensor 1003 attached to the robot arm 1001 or installed in the environment or data which is measured in advance may be read from a storage device as the noncontact measurement data. The noncontact measurement data may be a two-dimensional image or a range image, or may be an aggregation of three-dimensional points, normal lines of the three-dimensional points, and three-dimensional features. The noncontact measurement data may be an aggregation of geometric features, such as edges or feature points detected in a two-dimensional image, as long as the noncontact measurement data is information obtained by measuring the target object 1104 in a noncontact manner. If the obtained noncontact measurement data is a local coordinate system, the noncontact measurement data may be transformed into that in the reference coordinate of the robot arm 1001 using the calibration information held in the data holding unit.

The contact position obtaining unit at least obtains contact positions in the target object 1104 in the reference coordinate of the robot arm 1001. The contact positions may be obtained by directly detecting touches by the contact sensor or may be obtained indirectly detecting touches by detecting loads applied to the robot hand 1002 or fingers. Data measured in advance may be read from the storage device. If the obtained contact positions are in a local coordinate system, the contact positions may be transformed into those in the reference coordinate of the robot arm 1001 using the calibration information held in the data holding unit.

The accuracy obtaining unit at least obtains accuracy information of the noncontact measurement data obtained by the noncontact measurement data obtaining unit and accuracy information of the contact positions obtained by the contact position obtaining unit. Data measured in advance may be read from the storage device. Any expression may be used for representing the accuracy information as long as the accuracy of the noncontact measurement data and the accuracy of the contact position are represented. Error distribution or measurement reliability may be used. Furthermore, a degree of accuracy may be set high when the number of similar measurement points is large, or brightness of a captured image or intensity of geometric features may be used. The error distribution may be a normalized covariance matrix or a variance of normal distribution. A table of error distributions which is generated by performing measurement a plurality of times in advance using a three-dimensional coordinate as a key may be used, a function may be assigned to the table, or the table may be modeled and used as a parameter. The key of the table and the function is not limited to the three-dimensional coordinate but also brightness of pixels, intensity of geometric features, or a direction of a plane.

The position orientation calculation unit at least obtains a position-orientation of the target object 1104 in the reference coordinate of the robot arm 1001 in accordance with the following information: (1) information on a shape of the target object 1104 held by the data holding unit; (2) the approximate position-orientation of the target object 1104 obtained by the approximate position-orientation obtaining unit; (3) the noncontact measurement data obtained by the noncontact measurement data obtaining unit; (4) the contact positions of the robot hand 1002 obtained by the contact position obtaining unit; and (5) the accuracy of the noncontact measurement data and the accuracy of the contact positions of the robot hand 1002 obtained by the accuracy obtaining unit. The position-orientation may be calculated by the ICP algorithm. Alternatively, a similarity degree between a geometric feature extracted from the information on the shape of the target object 1104 and a geometric feature extracted from the noncontact measurement data and the contact positions is measured and a position-orientation may be calculated in accordance with a distance between geometric features having similarity. Furthermore, a distance between points or a distance between a point and a plane may be used as a distance between shape information of the target object 1104 and the noncontact measurement data and the contact positions. Furthermore, an optimization method, such as the maximum likelihood estimation or the least-squares estimation, may be used for the calculation of a position-orientation, or a position-orientation which has the highest evaluation value based on a distance may be searched for by full search.

Furthermore, the accuracy of the noncontact measurement data and the accuracy of the contact positions may be used as a covariance matrix in the maximum likelihood estimation or a weight of the least-squares estimation, or may be used as a weight of the evaluation value. Furthermore, data having accuracy which is equal to or smaller than a predetermined threshold value may not be used for the calculation of a position-orientation. A position-orientation may be calculated only using the contact points without using the entire noncontact measurement data if mean accuracy, minimum accuracy, and maximum accuracy of the noncontact measurement data which have been checked are larger than a predetermined threshold value. On the other hand, if the mean accuracy and the like of the contact points are larger than a predetermined threshold value, the position-orientation may be calculated only using the noncontact measurement data. Moreover, if both of the accuracy of the noncontact measurement data and the accuracy of the contact points are smaller than the respective threshold values, at least one of the noncontact measurement data and the contact positions may be measured again so that the accuracy is obtained again and the position-orientation is calculated again. In addition, only one of the noncontact measurement data and the contact points which has higher accuracy may be used.

The contact position determination unit at least determines at least one of the grasping positions and the contact positions of the target object 1104 so that smaller ambiguity of a calculated position-orientation is obtained. The grasping positions and the contact positions may be determined by selecting points or planes having normal lines which extend in a direction the most similar to the most ambiguous direction of the calculated position-orientation of the target object 1104. Moreover, it is determined whether the grasping positions and the contact positions are available for touching using the shape information of the robot hand 1002 and only touchable positions may be selected.

According to this specification, even when measurement information of a portion of an object may not be obtained, a position-orientation may be measured with high accuracy.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-249426, filed Dec. 9, 2014, which is hereby incorporated by reference herein in its entirety.

The invention claimed is:

1. An information processing apparatus comprising:
    a data holding unit configured to hold information on a shape of a target object;
    an approximate position-orientation obtaining unit configured to obtain an approximate position-orientation of the target object;
    a positional information obtaining unit configured to obtain positional information of the target object by measuring the target object by a noncontact sensor;
    a contact position information obtaining unit configured to obtain positional information of contact positions touched by a contact sensor when the contact sensor is brought into contact with the target object;
    an obtaining unit configured to obtain first accuracy information indicating accuracy of the positional information of the target object obtained by the positional information obtaining unit and second accuracy information indicating accuracy of the positional information of the contact positions obtained by the contact position obtaining unit; and
    a position-orientation obtaining unit configured to obtain a position-orientation of the target object by associating the shape information of the target object held in the data holding unit with at least one of the positional information of the target object and the positional information of the contact positions in accordance with the approximate position-orientation, the first accuracy information, and the second accuracy information.

2. The information processing apparatus according to claim 1, wherein the first accuracy information is error distribution of data measured by the noncontact sensor.

3. The information processing apparatus according to claim 1, wherein the second accuracy information is error distribution which spreads in directions orthogonal to normal lines of planes of the target object in the contact positions.

4. The information processing apparatus according to claim 1, wherein the position-orientation obtaining unit calculates a position-orientation of the target object by assigning a large weight to more probable positional information selected from among the positional information of the target object and the positional information of the contact positions in accordance with the first accuracy information and the second accuracy information.

5. The information processing apparatus according to claim 1, wherein
    the first accuracy information and the second accuracy information indicate spread of error distribution of positional information, and
    the position-orientation obtaining unit calculates a position-orientation of the target object in accordance with weights set to the positional information of the target object and the positional information of the contact positions in accordance with the spread of the error distribution of the positional information of the target object and the spread of the error distribution of the positional information of the contact positions.

6. The information processing apparatus according to claim 1, further comprising:
    a contact position determination unit configured to determine a contact position to be touched by the contact sensor in accordance with the positional information of the target object obtained by the positional information obtaining unit.

7. The information processing apparatus according to claim 1, wherein the noncontact sensor is an imaging device and the positional information is a feature of the target object extracted from an image obtained by the imaging device.

8. The information processing apparatus according to claim 1, wherein the contact sensor is attached to a robot hand used to grasp the target object.

9. The information processing apparatus according to claim 1, wherein the position-orientation obtaining unit calculates a position-orientation of the target object by associating the shape information of the target object with a selected one of the positional information of the target object and the positional information of the contact positions.

10. A system comprising:
the information processing apparatus set forth in claim 1; and
a holding/grasping unit configured to hold or grasp the target object.

11. An information processing method comprising:
obtaining an approximate position-orientation of a target object;
obtaining positional information of the target object by measuring the target object using a noncontact sensor;
obtaining positional information of contact positions touched by a contact sensor when the contact sensor is brought into contact with the target object;
obtaining first accuracy information indicating accuracy of the positional information of the target object and second accuracy information indicating accuracy of the positional information of the contact positions; and
obtaining a position-orientation of the target object by associating held information on a shape of the target object with at least one of the positional information of the target object and the positional information of the contact positions in accordance with the approximate position-orientation, the first accuracy information, and the second accuracy information.

12. A non-transitory computer-readable medium storing a program including instructions, which when executed by one or more processors of an information processing apparatus, cause the information processing apparatus to:
obtain an approximate position-orientation of the target object;
obtain positional information of the target object by measuring the target object by a noncontact sensor;
obtain positional information of contact positions touched by a contact sensor when the contact sensor is brought into contact with the target object;
obtain first accuracy information indicating accuracy of the positional information of the target object and second accuracy information indicating accuracy of the positional information of the contact positions; and
obtain a position-orientation of the target object by associating held information on a shape of the target object with at least one of the positional information of the target object and the positional information of the contact positions in accordance with the approximate position-orientation, the first accuracy information, and the second accuracy information.

* * * * *